Patented Sept. 26, 1950

2,524,024

UNITED STATES PATENT OFFICE 2,524,024

METHOD OF MAKING CARBOXYMETHYL CELLULOSE

Richard W. Swinehart, Midland, and Stanley R. Allen, Bay City, Mich., assignors to The Dow Chemical Company, Midland, Mich., a corporation of Delaware No Drawing. Application October 16, 1947, Serial No. 780,298

3 Claims. (Cl. 260—231)

This invention relates to an improved method for the manufacture of the water-soluble sodium salt of carboxymethyl cellulose.

There are recognized at least three distinct classes of carboxymethyl cellulose, differing from one another in the solubility of their respective sodium salts. These differences in solubility are largely due to differences in the number of etherifying (carboxymethyl) units present in the average anhydroglucose unit of the cellulose chain. Thus, the sodium salt of a carboxymethyl cellulose having up to about 0.2 carboxymethyl groups per $C_6$ unit is soluble in dilute sodium hydroxide solution of 4 to 8 per cent concentration only after the mixture is frozen, and is not soluble in water. Products with slightly higher degrees of etherification are known which are soluble in dilute alkali solutions at or below room temperature but above the freezing point. Another class of ether, having from 0.3 to about 1.5 carboxymethyl groups per $C_6$ unit, forms sodium salts which are directly soluble in either hot or cold water. It is this class of ether with which the present invention is concerned.

Within the class of carboxymethyl ethers of cellulose whose sodium salts are soluble in water, there exists a considerable variation in specific behavior when samples of such ethers are dissolved in water. It is common to find that the aqueous solution is somewhat hazy, and that it contains small but undesirable amounts of insoluble matter. Thus, when a 1 per cent solution of the ether, by weight, in water is centrifuged in a Goetz tube, there appears a deposit of a watery gel which may represent as much as 2.5 per cent of the volume of the tested solution. While the solids content of such deposit is very minute, it represents a condition of incomplete solubility which is undesirable for some uses. It is preferred that the volume of such gel be reduced below a value of 0.25 per cent, and that it be eliminated, if possible. Haze, which is independent of the amount of insoluble gel which may be deposited when the solution is centrifuged, apparently represents a condition of non-uniform substitution in the ether. The haziness of a standard aqueous solution is designated empirically as being Bad, Medium, Good, or Excellent, the last representing a crystal-clear, haze-free solution. For many commercial uses a carboxymethyl cellulose is unacceptable unless the aqueous solution of its sodium salt has a haze rating of "Good" or better. It has been found, further, that among the carboxymethyl ethers of cellulose whose sodium salts are soluble in water, the most consistently rapid rate of solution in water is obtained with those ethers containing from 0.6 to 1.1 carboxymethyl groups per $C_6$ unit.

Carboxymethyl celluloses are prepared, in general, by impregnating cellulose with aqueous sodium hydroxide and treating the resulting alkali cellulose with chloroacetic acid or one of its soluble salts at or near room temperature, or by treating the cellulose first with the chloroacetic acid solution and then with sodium hydroxide. The former sequence of operations is most commonly employed, and is described in various patents, including U. S. 2,236,545 to the assignees of Maxwell and Larson. The latter sequence of operations is described by Collings et al. in U. S. 2,278,612. Neither process, however, has been found to produce consistently a carboxymethyl cellulose of the desired freedom from haze and insoluble matter, though the specific conditions recited in the patents mentioned above produce a much better grade of such ethers than are obtained under many of the previously suggested conditions of etherification.

It is the principal object of the present invention to provide a process for the preparation of carboxymethyl cellulose containing from 0.6 to 1.1 carboxymethyl groups per $C_6$ unit and whose sodium salt dissolves freely in water consistently to form solutions having haze ratings of "Good" or better and containing 0.25 per cent or less, by volume, of insoluble matter.

We have found that the haze rating of the aforesaid carboxymethyl cellulose is greatly improved when a procedure is employed, whereby cellulose is first treated with sodium hydroxide to form alkali cellulose and the latter treated with chloroacetic acid, as in the known process, but then the product of the last-mentioned reaction is again treated with sodium hydroxide. More particularly, cellulose is first impregnated with an aqueous sodium hydroxide solution of from 35 to 50 per cent concentration, and the wet mass is pressed to expel excess solution until the sodium hydroxide content is adjusted to from 0.45 to 1.0 part by weight per part of cellulose. The resulting alkali cellulose is impregnated with an aqueous chloroacetic acid solution of from 50 to 80 per cent concentration, and the mass is pressed to give a ratio of from 0.6 to 2.2 parts by weight of chloroacetic acid per part of cellulose. Finally, the latter mass is impregnated with a 35 to 50 per cent sodium hydroxide solution and pressed to form a product wherein the total amount of sodium hydroxide from the first and third treatment steps is between 0.75 and 1.75 part per part of cellulose. Although amounts of chloroacetic acid may be used up to 2.2 parts per part of cellulose, it is preferable to limit the amount of this reagent to 1.50 parts by weight, as the larger amounts tend to generate too much heat and to require expensive cooling operations to avoid excessive viscosity reduction in the product. The resulting mass is allowed to react at a temperature between 0° and 80° C., with or without shredding, for at least one hour, and the carboxymethyl cellulose is recovered in known manner.

The new process is adapted to convenient continuous operation which may be carried out by conveying a sheet of cellulose into and through the first alkali bath, thence through a set of squeeze rolls, then through the chloroacetic acid bath and more squeeze rolls, and finally through the second alkali bath and a third set of squeeze rolls. The residence time of the sheet in each bath may be adjusted by alteration of the length of path traversed in that bath so that an adequate amount of treating liquor is absorbed, and the setting of the respective squeeze rolls may be fixed readily for each condition of settled operation to remove the excess treating liquors down to the above-recited residual weight ratios. Following the 3-step impregnation of the cellulose, the duration of the reaction period may be varied in accordance with known principles to effect the desired reduction in viscosity (as measured in standard aqueous solution) of the sodium carboxymethyl cellulose. It has been found that the reaction period should be at least one hour in order to obtain the required degree of etherification, and that temperatures above about 80° C. are undesirable because of the extremely rapid degradation of the cellulose which such temperatures may cause. The reaction may be allowed to proceed while the impregnated cellulose is being shredded or the impregnated cellulose in sheet form may be rolled and stored, suitably in a closed drum, during the reaction period.

The following examples illustrate the practice of the invention:

EXAMPLE 1

A sheet of cellulose pulp 6 inches wide was unwound from a supply roll and passed at room temperature through a bath of 47 per cent sodium hydroxide at a rate such that the sheet was immersed in the bath for 5 seconds. The resulting alkali cellulose sheet was led directly from the bath through a pair of rubber squeeze rollers which were adjusted to express alkali solution until titration of the alkali in a weighed sample of the pressed sheet showed a residual sodium hydroxide content of 0.8 part by weight per part of cellulose. When this condition was established, the alkali cellulose sheet was withdrawn from the alkali bath continuously through the squeeze rolls and was led through a second bath consisting of a 75 per cent solution in water of monochloroacetic acid. The sheet remained in this bath for 5 seconds and was led directly therefrom through a second set of squeeze rolls which were adjusted to leave 1.2 parts of chloroacetic acid in the sheet for each part by weight of cellulose. The resulting pressed sheet was conducted through a final bath of 47 per cent sodium hydroxide, where it followed a longer path and remained immersed for 45 seconds, whereupon it passed through a third set of squeeze rolls adjusted to reduce the total amount of sodium hydroxide (including that from the first bath) to a weight of 1.1 part per part of cellulose. The total amounts of reagents present at this stage were 1.10 parts sodium hydroxide, 1.20 parts chloroacetic acid, 1.62 parts water and 1.0 part of cellulose. The so-impregnated sheet was shredded for 15 minutes at room temperature and the resulting fluffy product was stored for 16 hours, without added heat, in a steel drum. At the end of this period it was purified by known procedures to remove sodium chloride and any remaining trace of sodium chloroacetate and excess sodium hydroxide. Specifically, the crude product was dissolved in water and the excess sodium hydroxide was neutralized carefully by the addition of dilute hydrochloric acid. The cellulose ether remained in solution. It was precipitated therefrom by the addition of 95 per cent ethyl alcohol to the solution. The precipitate was freed from salts and other water-soluble impurities by washing with a 60 per cent aqueous solution of ethyl alcohol. The so-purified sodium carboxymethyl cellulose dissolved readily in water at room temperature, to form solutions having an "Excellent" haze rating. When standard solutions were centrifuged in a 100 ml. Goetz tube having a lower tip graduated in 0.05 ml. units, no detectable gel or other sediment was thrown out. The product was found to contain 0.82 carboxymethyl groups per $C_6$ unit.

EXAMPLE 2

In a manner similar to that disclosed in the preceding example, numerous etherification reactions were carried out within the above-recited range of operating conditions. For comparison, some of the same cellulose was etherified by a two-step process using a first alkali bath and a final chloroacetic acid bath, and more of the cellulose was etherified in a two-step process using a first chloroacetic acid bath and a final alkali bath. Additional preparations were made using a three-step process similar to that of the present invention, but employing sodium hydroxide solutions of concentrations outside of the 35–50 per cent range. The products were purified by standard procedure, analyzed for their carboxymethyl content, and tested to determine the haze rating and amount of "solids." The results are set forth in the following table. The chloroacetic acid bath in each instance reported in the table was of 75 per cent concentration. The symbol "tr." is used in the "solids" column to indicate the presence of amounts of gel less than 0.05 per cent by volume.

Table

| No. | First Alkali Bath — Sodium Hydroxide, Per Cent | First Alkali Bath — Time | First Alkali Bath — Ratio Alkali to Cellulose | Chloroacetic Acid Bath — Time | Chloroacetic Acid Bath — Ratio Acid to Cellulose | Second Alkali Bath — Time | Total Ratio Alkali to Cellulose (47% NaOH used) | Degree of Substitution | Haze | Solid Per Cent |
|---|---|---|---|---|---|---|---|---|---|---|
| 1 | 47 | 5 sec | 0.72 | 1 min | 1.30 | 5 sec | 1.09 | 0.94 | Ex. | tr. |
| 2 | 47 | do | 0.72 | do | 1.50 | 10 sec | 1.04 | 0.94 | do | 0 |
| 3 | 47 | do | 0.70 | do | 1.35 | 20 sec | 1.15 | 0.68 | do | 0 |
| 4 | 47 | do | 0.75 | do | 1.45 | 30 sec | 1.24 | 0.64 | do | 0 |
| 5 | 47 | do | 0.76 | do | 1.45 | 1 min | 1.35 | 0.76 | do | 0 |
| 6 | 47 | do | 1.23 | 2 min | 2.10 | 5 sec | 1.49 | 0.62 | G.-Ex. | 0.05 |
| 7 | 47 | do | 1.27 | do | 2.20 | 10 sec | 1.68 | 0.70 | Ex. | tr. |
| 8 | 47 | do | 0.87 | do | 1.27 | 20 sec | 1.26 | 0.78 | G.-Ex. | 0 |
| 9 | 47 | do | 0.71 | do | 1.29 | 30 sec | 1.00 | 0.82 | do | 0 |
| 10 | 47 | do | 0.75 | do | 1.46 | 1 min | 1.10 | 0.79 | do | 0 |
| 11 | 47 | do | 0.71 | 3 min | 1.46 | 5 sec | 0.92 | 0.66 | Good | 0.05 |
| 12 | 47 | do | 0.67 | do | 1.27 | 10 sec | 0.88 | 0.74 | do | 0.15 |
| 13 | 47 | do | 0.84 | do | 1.70 | 20 sec | 1.12 | 0.75 | do | 0.10 |
| 14 | 47 | do | 0.82 | do | 1.57 | 30 sec | 1.12 | 0.75 | Ex. | 0.05 |
| 15 | 47 | do | 0.78 | do | 1.51 | 1 min | 1.05 | 0.78 | do | tr. |
| 16 | 47 | do | 0.45 | 30 sec | 0.57 | 30 sec | 0.91 | 0.69 | Good | 0.05 |
| 17 | 38 | do | 0.70 | do | 0.97 | 1 min | 1.00 | 0.74 | Ex. | 0.10 |
| 18 | 38 | do | 0.70 | do | 0.90 | do | 0.95 | 0.75 | G.-Ex. | tr. |
| 19 | 25 | do | 0.50 | do | 0.56 | do | 0.75 | 0.51 | Med.-G. | 1.10 |
| 20 | 25 | do | 0.50 | do | 0.44 | do | 0.78 | 0.38 | Bad | 2.00 |
| 21 | 47 | do | 0.68 | 1 min | 1.27 | None | | 0.42 | do | 2.5 |
| 22 | 47 | do | 0.70 | 2 min | 1.52 | do | | 0.50 | do | 2.2 |
| 23 | 47 | do | 0.70 | 3 min | 1.65 | do | | 0.62 | do | 2.0 |
| 24 | 47 | 1 min | 1.50 | 1 min | 1.06 | do | | 0.48 | do | 1.1 |
| 25 | 47 | do | 1.50 | 2 min | 1.13 | do | | 0.66 | Med.-Bad | 1.5 |
| 26 | | | | 5 sec | 0.71 | 15 sec., 41% | 0.98 | 0.51 | Good | 1.3 |
| 27 | | | | do | 0.99 | do | 1.08 | 0.58 | do | 2.6 |
| 28 | | | | do | 0.77 | 15 sec., 50% | 1.14 | 0.51 | do | 0.2 |
| 29 | | | | do | 0.79 | do | 1.07 | 0.44 | do | 2.4 |

We claim:

1. The method which comprises: first, immersing cellulose of high alpha-cellulose content in a water solution of sodium hydroxide of from 35 to 50 per cent concentration, pressing the mass to leave a ratio therein of from 0.45 to 1.0 part by weight of sodium hydroxide per part of cellulose; second, immediately thereafter impregnating the resulting alkali cellulose with a water solution of chloroacetic acid of from 50 to 80 per cent concentration and pressing the mass to leave a ratio therein of from 0.6 to 2.2 parts by weight of chloroacetic acid per part of cellulose; third, immediately thereafter impregnating the so-treated mass with additional sodium hydroxide solution of from 35 to 50 per cent concentration and pressing the mass to retain therein a total amount of sodium hydroxide from the first and third steps between 0.75 and 1.75 parts by weight per part of cellulose; allowing the resulting mass to stand for at least one hour at a reaction temperature between 0° and 80° C., and recovering the sodium salt of carboxymethyl cellulose therefrom always containing at least 0.6 carboxymethyl group per $C_6$ unit and which is directly soluble in water to form a haze-free solution never containing over 0.25 per cent of insoluble matter.

2. The method which comprises: first, immersing cellulose of high alpha-cellulose content in a water solution of sodium hydroxide of from 35 to 50 per cent concentration, pressing the mass to leave a ratio therein of from 0.45 to 1.0 part by weight of sodium hydroxide per part of cellulose; second, immediately thereafter impregnating the resulting alkali cellulose with a water solution of from 35 to 50 per cent concentration and pressing the mass to retain therein a total amount of sodium hydroxide from the first and third steps between 0.75 and 1.75 parts by weight per part of cellulose; allowing the resulting mass to stand for at least one hour at a reaction temperature between 0° and 80° C., and recovering the sodium salt of carboxymethyl cellulose therefrom always containing at least 0.6 carboxymethyl group per $C_6$ unit and which is directly soluble in water to form a haze-free solution never containing over 0.25 per cent of insoluble matter.

3. The method which comprises immersing a sheet of cellulose of high alpha-cellulose content in a water solution of sodium hydroxide of from 35 to 50 per cent concentration while continuously conducting the sheet through the solution; pressing the moving sheet as it leaves said solution to reduce the amount of sodium hydroxide retained therein to from 0.45 to 1.0 part by weight per part of cellulose; immediately thereafter immersing the sheet in a water solution of chloroacetic acid of from 50 to 80 per cent concentration while continuously conducting the sheet through the chloroacetic acid solution; pressing the moving sheet as it leaves the chloroacetic acid solution to reduce the amount of chloroacetic acid therein to from 0.6 to 1.5 parts by weight per part of cellulose; immediately thereafter immersing the so-treated sheet in and moving it through a second aqueous sodium hydroxide bath of from 35 to 50 per cent concentration; pressing the sheet as it leaves said bath to reduce the total weight of retained sodium hydroxide to from 0.75 to 1.75 parts per never containing over 0.25 per cent of insoluble matter.

RICHARD W. SWINEHART.
STANLEY R. ALLEN.

REFERENCES CITED

The following references are of record in the file of this patent:

UNITED STATES PATENTS

| Number | Name | Date |
|---|---|---|
| 2,101,263 | Maxwell | Dec. 7, 1937 |
| 2,131,733 | Haskins et al. | Oct. 4, 1938 |
| 2,254,249 | Swinehart et al. | Sept. 2, 1941 |
| 2,278,612 | Collings et al. | Apr. 7, 1942 |
| 2,340,177 | Dreyfus | Jan. 25, 1944 |
| 2,362,900 | Groombridge et al. | Nov. 14, 1944 |